United States Patent
Luo (10) Patent No.: US 12,204,739 B2
(45) Date of Patent: Jan. 21, 2025

(54) COMMENT PROMPT METHOD, APPARATUS, ELECTRONIC DEVICE, STORAGE MEDIUM AND PROGRAM PRODUCT

(71) Applicant: Beijing Zitiao Network Technology Co., Ltd., Beijing (CN)

(72) Inventor: Song Luo, Beijing (CN)

(73) Assignee: BEIJING ZITIAO NETWORK TECHNOLOGY CO., LTD., Beijing (CN)

( * ) Notice: Subject to any disclaimer, the term of this patent is extended or adjusted under 35 U.S.C. 154(b) by 0 days.

(21) Appl. No.: 18/747,742

(22) Filed: Jun. 19, 2024

(65) Prior Publication Data

US 2024/0345698 A1 Oct. 17, 2024

Related U.S. Application Data

(63) Continuation of application No. PCT/CN2023/070856, filed on Jan. 6, 2023.

(30) Foreign Application Priority Data

Jan. 14, 2022 (CN) .......................... 202210044820.5

(51) Int. Cl.
*G06F 3/04817* (2022.01)
*G06F 3/0484* (2022.01)

(52) U.S. Cl.
CPC ........ *G06F 3/04817* (2013.01); *G06F 3/0484* (2013.01)

(58) Field of Classification Search
None
See application file for complete search history.

(56) References Cited

U.S. PATENT DOCUMENTS

| 2007/0115256 | A1 | 5/2007 | Lee et al. | |
| 2021/0389858 | A1* | 12/2021 | Gong | G06F 3/0485 |
| 2023/0044057 | A1* | 2/2023 | Kang | H04N 21/4532 |

FOREIGN PATENT DOCUMENTS

| CN | 105898336 A | 8/2016 |
| CN | 109739418 A | 5/2019 |
| CN | 110008395 A | 7/2019 |

(Continued)

OTHER PUBLICATIONS

China National Intellectual Property Administration, Office Action and Search Report issued in Chinese Application No. 202210044820. 5, Jun. 1, 2023, 24 pages. (Submitted with partial English translation).

*Primary Examiner* — Tuan S Nguyen (74) *Attorney, Agent, or Firm* — Alleman Hall & Tuttle LLP (57) ABSTRACT

The present disclosure provides a comment prompt method, an electronic device and a storage medium. The comment prompt method includes: displaying a multimedia content on a content display page; and displaying, in response to a determination that there is a popular comment on the multimedia content, comment prompt information on the content display page when a display duration of the multimedia content reaches a first preset duration threshold, wherein the comment prompt information is used to prompt an active user to view comments on the multimedia content by triggering a display position of a comment control.

12 Claims, 5 Drawing Sheets

(56) References Cited

FOREIGN PATENT DOCUMENTS

| CN | 305492343 | S |   | 12/2019 |             |
|----|-----------|---|---|---------|-------------|
| CN | 111597467 | A |   | 8/2020  |             |
| CN | 112256166 | A |   | 1/2021  |             |
| CN | 112351350 | A | * | 2/2021  | G06F 16/9535 |
| CN | 113221040 | A | * | 8/2021  | G06F 16/957 |
| CN | 113342221 | A |   | 9/2021  |             |
| CN | 113568545 | A |   | 10/2021 |             |
| CN | 114491098 | A |   | 5/2022  |             |

\* cited by examiner

COMMENT PROMPT METHOD, APPARATUS, ELECTRONIC DEVICE, STORAGE MEDIUM AND PROGRAM PRODUCT

CROSS-REFERENCE TO RELATED APPLICATIONS

This application is a continuation of International Patent Application No. PCT/CN2023/070856, filed on Jan. 6, 2023, which claims the priority to and benefits of the Chinese patent application No. 202210044820.5 filed on Jan. 14, 2022. All the aforementioned patent applications are hereby incorporated by reference in their entireties.

TECHNICAL FIELD

Embodiments of the present disclosure relate to the technical field of computers, in particular to a comment prompt method, an apparatus, an electronic device, a storage medium, and a program product.

BACKGROUND

At present, users may perform interaction operations by triggering interaction controls of videos in the process of watching the videos. In related art, the interaction controls are generally displayed in the form of icons.

However, this presentation form may not clearly prompt the functions of each icon, leading to a poor interaction experience for the user.

SUMMARY

The embodiments of present disclosure provide a comment prompt method, an apparatus, an electronic device, a storage medium, and a program product, for clearly prompt functions of comment controls.

In a first aspect, the embodiments of present disclosure provide a comment prompt method, including:
  displaying a multimedia content on a content display page; and
  displaying, in response to a determination that there is a popular comment on the multimedia content, comment prompt information on the content display page when a display duration of the multimedia content reaches a first preset duration threshold, wherein the comment prompt information is used to prompt an active user to view comments on the multimedia content by triggering a display position of a comment control.

In a second aspect, the embodiments of present disclosure provide a comment prompt apparatus, including:
  a content display module, configured to display a multimedia content on a content display page; and
  an information display module, configured to display, in response to a determination that there is a popular comment on the multimedia content, comment prompt information on the content display page when a display duration of the multimedia content reaches a first preset duration threshold, wherein the comment prompt information is used to prompt an active user to view comments on the multimedia content by triggering a display position of a comment control.

In a third aspect, the embodiments of present disclosure provide an electronic device, including:
  a processor; and
  a memory, configured to store a program, the program, when executed by the processor, causes the processor to implement the comment prompt method according to embodiments of the present disclosure.

In a fourth aspect, the embodiments of present disclosure provide a computer-readable storage medium, wherein a computer program is stored in the storage medium, and when the computer program is executed by a processor, the comment prompt method according to embodiments of the present disclosure.

In a fifth aspect, the embodiments of present disclosure provide a computer program product, wherein the computer program product, when is executed by a computer, causes the computer to implement the comment prompt method according to embodiments of the present disclosure.

BRIEF DESCRIPTION OF THE DRAWINGS

By combining the accompanying drawings and referring to the following specific implementations, the above and other features, advantages, and aspects of embodiments disclosed herein will become more apparent. Throughout the figures, the same or similar reference signs indicate the same or similar elements. It should be understood that the attached drawings are illustrative, and units and elements may not necessarily be drawn to scale.

DETAILED DESCRIPTION

The following will refer to the accompanying drawings to describe the embodiments disclosed herein. Although certain embodiments of the present disclosure are shown in the accompanying drawings, it should be understood that the present disclosure can be implemented in various forms, and these embodiments are provided for a more thorough and complete understanding of the present disclosure. It should be understood that the accompanying drawings and embodiments disclosed herein are for illustrative purposes only.

It should be understood that the multiple steps recorded in the embodiments of the disclosed method may be executed in different orders and/or in parallel. In addition, the method implementation may include additional steps and/or omitting the steps shown for execution.

The term "including" and its variations used herein are open-ended, meaning "including but not limited to". The term "based on" means "at least partially based on". The term "one embodiment" means "at least one embodiment". The term "another embodiment" means "at least one other embodiment". The term "some embodiments" means "at least some embodiments". The relevant definitions of other terms will be provided in the following description.

It should be noted that the concepts such as "first" and "second" mentioned in this disclosure are only used to distinguish between different devices, modules, or units.

It should be noted that the modifications of "one" and "multiple" mentioned in this disclosure are illustrative and those skilled in the art should understand that, unless otherwise explicitly stated in the context, they should be understood as "one or more".

The names of the messages or information exchanged between multiple devices in the disclosed embodiments are for illustrative purposes only.

Figure 1:
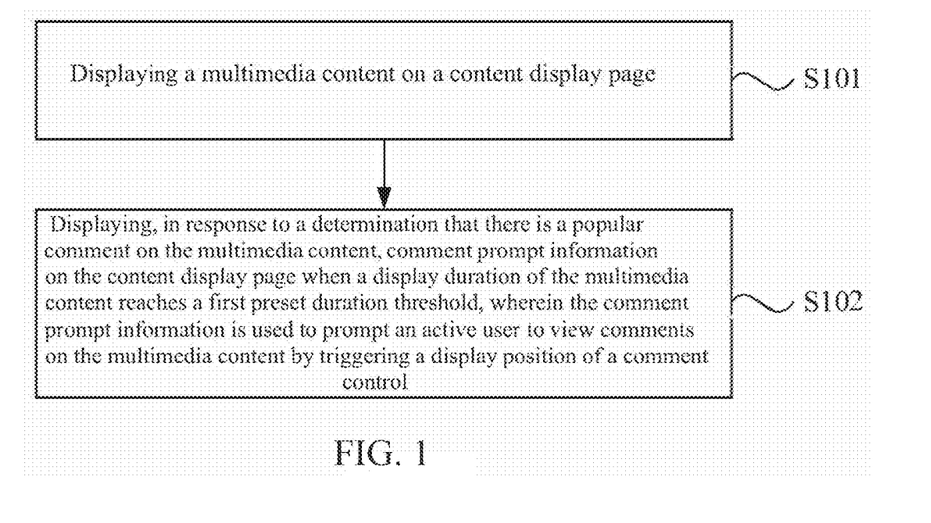
FIG. 1 is a flow schematic diagram of a comment prompt method provided in embodiments of the present disclosure.

FIG. 1 is a flow schematic diagram of a comment prompt method provided in embodiments of the present disclosure. The method may be executed by a comment prompt apparatus, herein the apparatus may be implemented by software and/or hardware and may be configured in an electronic device. Typically, it may be configured in a mobile phone or a tablet computer. The comment prompt method provided in the embodiments of the present disclosure is applicable to a scene in which the user is prompted to view comments. As shown in FIG. 1, the comment prompt method provided in the embodiments of the present disclosure may include:

S101, displaying a multimedia content on a content display page.

In the embodiments, the multimedia content may be a video, an audio, or an article or the like. The content display page may be a page that displays the multimedia content. The multimedia content being a video is described below as an example, in which, the content display page may be a video playing page.

Figure 2:
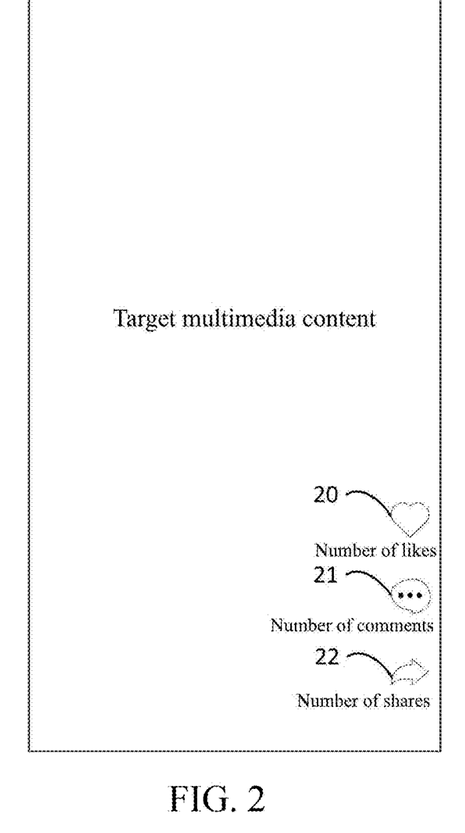
FIG. 2 is a schematic diagram of a content display page provided in embodiments of the present disclosure.

In an embodiment, when an active user wants to view a certain multimedia content, a content viewing operation for the multimedia content may be performed. Correspondingly, as shown in FIG. 2, when the content viewing operation of the active user is received by an electronic device, the electronic device may display the multimedia content corresponding to the content viewing operation on the content display page. For example, when the multimedia content corresponding to the content viewing operation is a video, the video playing page may be displayed, the video is played on the video playing page, and an interaction control such as a like control 20, a comment control 21 and/or a sharing control 22 of the multimedia content may be displayed on the content display page, as to facilitate the active user to like, comment, and/or share the multimedia content.

S102, displaying, in response to a determination that there is a popular comment on the multimedia content, comment prompt information on the content display page when a display duration of the multimedia content reaches a first preset duration threshold, wherein the comment prompt information is used to prompt an active user to view comments on the multimedia content by triggering a display position of a comment control.

In the embodiments, when the display duration of the multimedia content with the popular comment reaches the preset duration, the comment prompt information is displayed, which can prompt the user to view comments on the multimedia content by triggering the comment control. For example, the user is prompted to view the comments on the multimedia content by triggering a related display position of the comment prompt information (such as a display position of the comment control in which the comment prompt information is located or a comment control position pointed by the comment prompt information), thus, the comment function can be clearly prompted, and the prompt mode for the comment function is enriched, therefore, the user's comment viewing experience can be improved. In addition, only when the multimedia content with the popular comment is displayed, the active user is prompted to view the comments on the multimedia content, the excessive interference with the user's viewing of the multimedia content can be avoided, and a situation that the user may only view a small number of the comments or the comment with the poor quality based on the prompt is avoided, thus the active user's comment viewing experience can be highly improved.

In the embodiments, the popular comment may be a comment of which like information meets a preset like condition, such as a comment of which the number of likes is greater than a preset number threshold (such as 5000 or 10000) or the like rate is greater than a preset like rate threshold (such as 5% or 6%); and/or, a comment of which comment information meets a preset comment condition, such as a comment of which the number of replies is greater than a preset number threshold or the reply rate is greater than a preset reply rate threshold. Optionally, the popular comment includes at least one of the following: the comment of which the number of likes is greater than the preset number threshold, and the comment of the like rate is greater than the preset like rate threshold. The like rate of a certain comment may be a ratio of the number of likes of the comment to the number of views of the comment, and the number of likes may be the number of likes of the comment displayed in the comment panel for the multimedia content; and the reply rate of a certain comment may be a ratio of the number of replies of the comment to the number of views of the comment, the number of replies may be the total number of multiple comments that are replied to the comment displayed in the comment panel for the multimedia content.

The comment prompt information may be information used to prompt the active user to view the comments on the multimedia content, and the comment prompt information may be displayed in the display position of the comment control or pointed to the display position of the comment control. The comment prompt information may include at least one of a comment prompt effect and a comment prompt text, namely at least one form of the effect and the text may be used to prompt the active user. Here, the comment prompt information displayed on the content display page may include: at least one of the comment prompt effect and the comment prompt text is displayed on the content display page. Optionally, the embodiments may simultaneously use the forms of effect and text to prompt the active user to view the comments by triggering the comment control, so as to improve the prompt effect of the comment prompt information.

The active user may be understood as a user corresponding to an account currently logged in by a client. The first preset duration threshold may be understood as a preset multimedia content display duration threshold, and the first preset duration threshold may be flexibly set according to needs, such as the first preset duration threshold may be set as 5 seconds or 10 seconds or the like.

Figure 3:
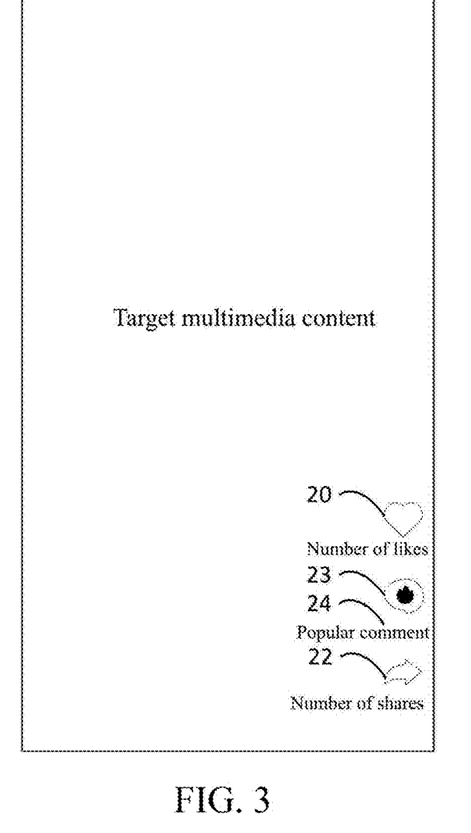
FIG. 3 is a schematic diagram of a display mode for prompt information provided in embodiments of the present disclosure.

In the embodiments, the electronic device may determine whether there is a popular comment on the multimedia content displayed currently. In response to determining that there is a popular comment on the multimedia content displayed currently, when the display duration of the multimedia content reaches the first preset duration threshold, the multimedia content is displayed on the content display page, and meanwhile, the comment prompt information is also displayed on the content display page. As shown in FIG.

3, the comment prompt information prompts the active user to view the comments on the multimedia content by triggering the comment control.

Here, the determination for whether there is a popular comment on the multimedia content may be flexibly set. For example, it may be determined whether there is a comment on the multimedia content displayed currently with a number of likes greater than the preset number threshold, such as it may be determined whether the number of likes of the comment with a highest number of likes among the comments on the multimedia content is greater than the preset number threshold; and/or, it may be determined whether there is a comment on the multimedia content displayed currently with a like rate greater than the preset like rate threshold, such as it may be determined whether a like rate of the comment among the comments on the multimedia content with a highest like rate is greater than the preset like rate threshold. When there is a comment on the multimedia content with a number of likes greater than the preset number threshold, or when there is a comment on the multimedia content with a like rate greater than the preset like rate threshold, the presence of the popular comment on the multimedia content is determined.

In the comment prompt method provided in the embodiments of the present disclosure, a multimedia content is displayed on a content display page; and in response to a determination that there is a popular comment on the multimedia content, comment prompt information is displayed on the content display page when a display duration of the multimedia content reaches a first preset duration threshold, in which, the comment prompt information is used to prompt an active user to view comments on the multimedia content by triggering a display position of a comment control. In the embodiments of the present disclosure, when there is a popular comment on the multimedia content, the user is prompted to view comments on the multimedia content by triggering the comment control, thus, the comment function can be clearly prompted, and the prompt mode for the comment function is enriched, therefore, the user's comment viewing experience can be improved.

Figure 4:
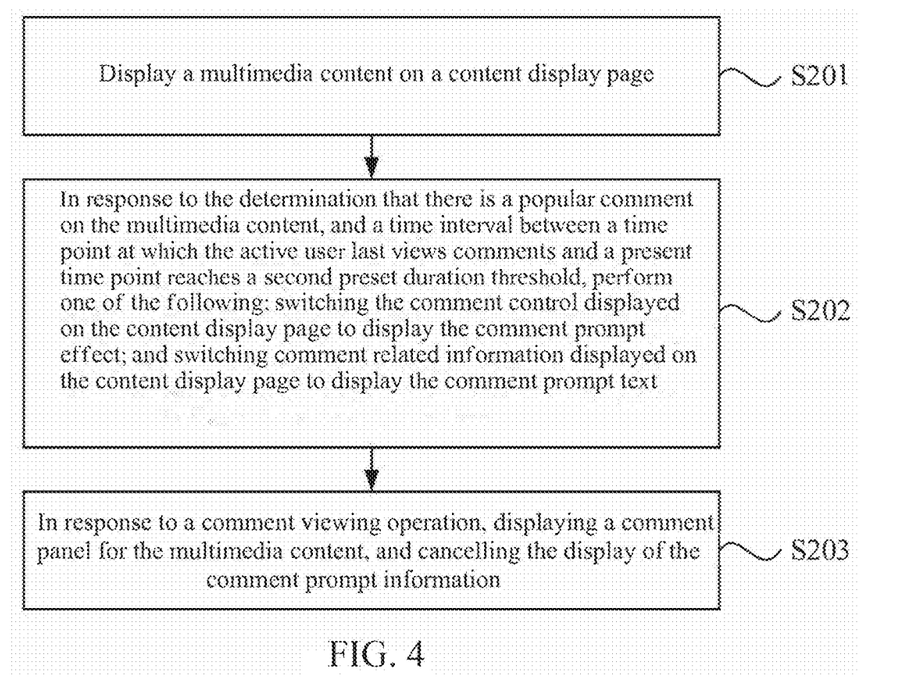
FIG. 4 is a flow schematic diagram of another comment prompt method provided in embodiments of the present disclosure.

FIG. 4 is a flow schematic diagram of another comment prompt method provided in embodiments of the present disclosure. The scheme in the embodiments may be combined with one or more optional schemes in the above embodiments. Optionally, the step of displaying at least one of the comment prompt effect and the comment prompt text on the content display page includes at least one of the following: the comment control displayed on the content display page is switched to display the comment prompt effect; and the comment related information displayed on the content display page is switched to display the comment prompt text.

Optionally, after the comment prompt information is displayed on the content display page, the method further includes: in response to a comment viewing operation, displaying a comment panel for the multimedia content, and cancelling the display of the comment prompt information, wherein the comment viewing operation includes a triggering operation for the comment prompt information, and the comment panel is used to display the comments on the multimedia content.

Optionally, the step of, displaying, in response to a determination that there is a popular comment on the multimedia content, comment prompt information on the content display page when a display duration of the multimedia content reaches a first preset duration threshold includes: in response to the determination that there is a popular comment on the multimedia content, and a time interval between a time point at which the active user last views comments and a present time point reaches a second preset duration threshold, displaying the comment prompt information on the content display page when the display duration of the multimedia content reaches the first preset duration threshold.

Correspondingly, as shown in FIG. 4, the comment prompt method provided in this embodiment may include:

S201, displaying a multimedia content on a content display page.

S202, in response to the determination that there is a popular comment on the multimedia content, and a time interval between a time point at which the active user last views comments and a present time point reaches a second preset duration threshold, perform one of the following: switching the comment control displayed on the content display page to display the comment prompt effect; and switching comment related information displayed on the content display page to display the comment prompt text, here, the comment prompt information includes at least one of the comment prompt effect and the comment prompt text, and the comment prompt information is used to prompt the active user to view the comments on the multimedia content by triggering a corresponding display position of the comment control.

In the embodiments, only when the active user does not view any comments for a long time, the comment prompt information is displayed, namely only when it is determined that the active user may have a comment barrier, such as when it is determined that the active user may not be aware of the function of the comment control or may not be aware of how to view the comments, the comment prompt information is displayed, so as to avoid the frequent display of the prompt information that may interfere with the active user's viewing of the multimedia content, and thus, the active user's experience can be further improved.

In addition, in the embodiments, at least one form of the effect and the text may be used to prompt the active user to view the comments by triggering the comment control. Here, the effect may be displayed in the display position of the comment control, and the text may be displayed in the display position of the comment related information, so as to improve the prompt effect of the comment prompt information in the case without causing additional obstruction to the multimedia content displayed, and thus, the active user's experience can be further improved.

In the embodiments, the second preset duration threshold may be a preset time interval threshold between a present moment and a moment at which the active user last views the comments. The second preset duration threshold may be flexibly set according to needs, such as the second preset duration threshold may be set as 20 days or 30 days or the like.

As shown in FIG. 3, the comment prompt effect 23 may be an effect used to prompt the active user to trigger the comment control. For example, the comment prompt effect 23 may display a comment control icon and a popular comment identifier, the popular comment identifier may be displayed inside the comment control icon. The comment prompt effect 23 may be an effect that controls the scaling of the comment control icon and the popular comment identifier according to a preset frequency, namely in the comment prompt effect 23, the comment control icon and the popular comment identifier may be scaled according to the preset frequency.

The comment related information may be information (such as text information) displayed on the content display page that is related with the comments on the multimedia content currently displayed or the comment control 21, such as the number of comments on the multimedia content as shown in FIG. 2. As shown in FIG. 3, the comment prompt text 24 may be a text used to prompt the active user to view the comments, such as a text used to prompt the active user to view the popular comment.

In the embodiments, when the electronic device displays a certain multimedia content, it may determine whether there is the popular comment on the multimedia content, obtain a time point at which the active user last views the comments, calculate the time length between this time point and the present time point (namely the present moment), and determine whether the time length reaches the second preset time threshold. When it is determined that there is the popular comment on the multimedia content, and the time length between the time point at which the active user last views the comments and the present time point reaches the second preset time threshold, the comment control displayed on the content display page is switched to display the comment prompt effect, namely displaying the comment control is cancelled, and the comment prompt effect is displayed in the original display position of the comment control; and/or, the comment related information displayed on the content display page is switched to display the comment prompt text, namely displaying the comment related information is cancelled, and the comment prompt text is displayed in the original display position of the comment related information.

In addition, according to the embodiments, when the comment prompt information is displayed, a display frequency of the comment prompt information may also be considered. Only when there is a popular comment on the multimedia content, a time interval between a time point at which the active user last views comments and a present time point reaches a second preset duration threshold, and the display frequency of the comment prompt information does not reach its preset display frequency threshold, the comment prompt information is displayed, so as to avoid the frequent display of the comment prompt information that may interfere the active user.

S203, in response to a comment viewing operation, a comment panel for the multimedia content is displayed, and the display of the comment prompt information is cancelled, here, the comment viewing operation includes a triggering operation for the comment prompt information, and the comment panel is used to display the comments on the multimedia content.

In the embodiments, the comment viewing operation may be an operation of viewing the comments on the multimedia content currently displayed, and the comment viewing operation may include an operation of triggering at least one of the comment prompt effect and the comment prompt text displayed on the display page, namely an operation of triggering a position used to display at least one of the comment control and the comment related information on the display page; and it may also include a touch gesture used to instruct the electronic device to display the comments on the multimedia content currently displayed, such as a touch gesture of sliding in a predetermined direction on the content display page.

Figure 5:
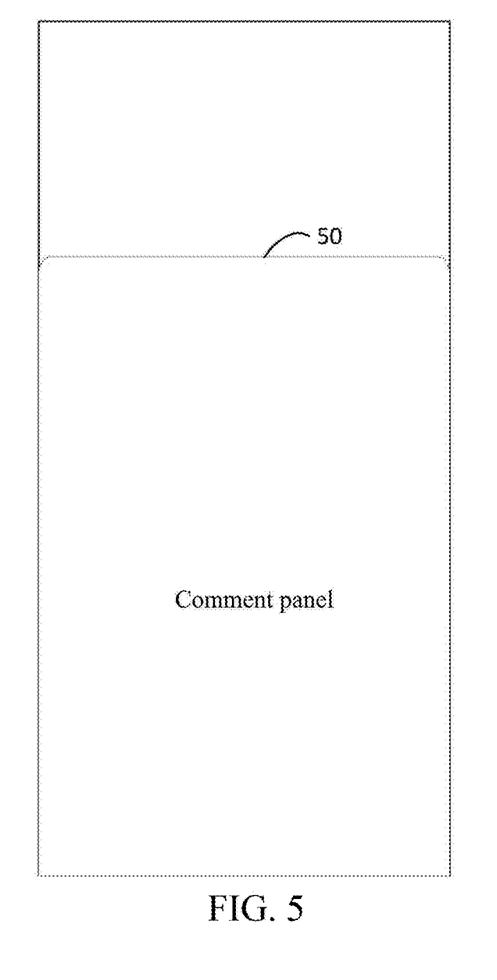
FIG. 5 is a schematic diagram of a comment panel provided in embodiments of the present disclosure.

In the embodiments, after the comment prompt information is displayed, the active user may perform the comment viewing operation when the active user wants to view the comments on the multimedia content based on the prompt information. Correspondingly, as shown in FIG. 5, when the electronic device receives the comment viewing operation from the active user, it may display the comment panel 50 and display the comment on the multimedia content in the comment panel 50 for viewing.

The comment prompt method provided in the embodiments can prompt the user without causing the additional obstruction to the multimedia content displayed on the content display page, and improve the display effect of the prompt information, thus, the user experience can be highly improved.

Figure 6:
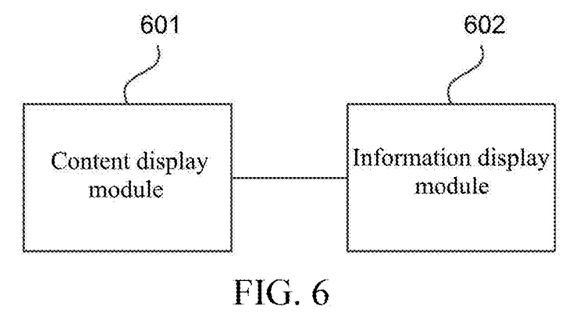
FIG. 6 is a structure block diagram of a comment prompt apparatus provided in embodiments of the present disclosure.
Figure 7:
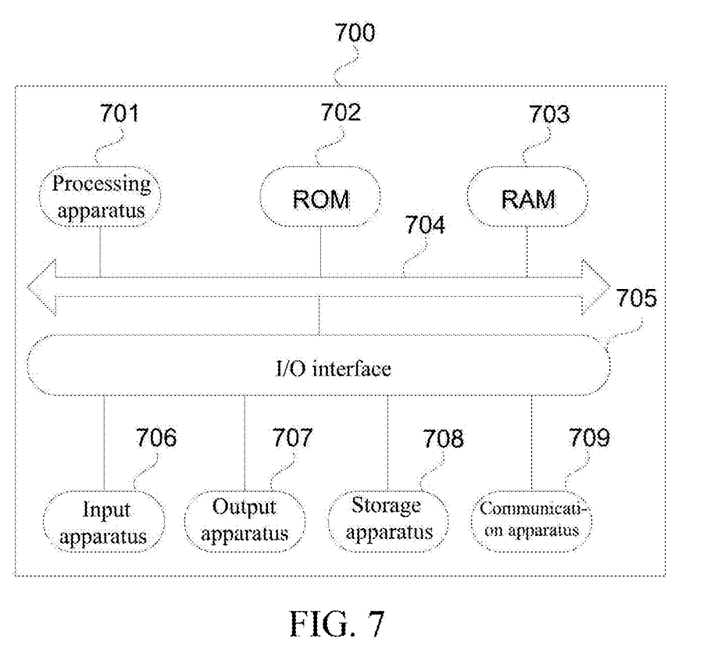
FIG. 7 is a structure schematic diagram of an electronic device provided in embodiments of the present disclosure.

FIG. 6 is a structure block diagram of a comment prompt apparatus provided in embodiments of the present disclosure. The apparatus may be implemented by software and/or hardware and may be configured in an electronic device. Typically, it may be configured in a mobile phone or a tablet computer and may prompt the user to view comments by executing a comment prompt method. As shown in FIG. 7, the comment prompt apparatus provided in the embodiments includes: a content display module 601 and an information display module 602, wherein:

The content display module 601 is configured to display a multimedia content on a content display page; and the information display module 602 is configured to display, in response to a determination that there is a popular comment on the multimedia content, comment prompt information on the content display page when a display duration of the multimedia content reaches a first preset duration threshold, wherein the comment prompt information is used to prompt an active user to view comments on the multimedia content by triggering a display position of a comment control.

In the comment prompt apparatus provided in the embodiments of the present disclosure, a multimedia content is displayed on a content display page by the content display module; and by the information display module, in response to a determination that there is a popular comment on the multimedia content, comment prompt information is displayed on the content display page when a display duration of the multimedia content reaches a first preset duration threshold, in which, the comment prompt information is used to prompt an active user to view comments on the multimedia content by triggering a display position of a comment control. In the embodiments of the present disclosure, when there is a popular comment on the multimedia content, the user is prompted to view comments on the multimedia content by triggering the comment control, thus, the comment function can be clearly prompted, and the prompt mode for the comment function is enriched, therefore, the user's comment viewing experience can be improved.

In the above solutions, the information display module 602 is configured to: display at least one of a comment prompt effect and a comment prompt text on the content display page.

In the above solutions, the information display module 602 is configured to perform at least one of the following: switching the comment control displayed on the content display page to display the comment prompt effect; and switching comment related information displayed on the content display page to display the comment prompt text.

Optionally, the comment prompt apparatus provided in the embodiments of the present disclosure further includes: a comment display module, which is configured to, after displaying the comment prompt information on the content display page, in response to a comment viewing operation, display a comment panel for the multimedia content, and cancel the display of the comment prompt information, in which, the comment viewing operation includes a triggering operation for the comment prompt information, and the comment panel is used to display the comments on the multimedia content In the above solutions, the popular comment includes at least one of the following: a comment with a number of likes greater than a preset number threshold, and a comment with a like rate greater than a preset like rate threshold.

In the above solutions, the information display module 602 is configured to: in response to the determination that there is a popular comment on the multimedia content, and a time interval between a time point at which the active user last views comments and a present time point reaches a second preset duration threshold, display the comment prompt information on the content display page when the display duration of the multimedia content reaches the first preset duration threshold.

The comment prompt apparatus provided in the embodiments of the present disclosure can execute the comment prompt method provided in any embodiments of the present disclosure, and have corresponding functional modules and beneficial effects for executing the comment prompt method. Technical details that are not fully described here can be found in the comment prompt method provided in any embodiments of the present disclosure.

Referring to FIG. 7, a structure schematic diagram of an electronic device (such as a terminal device) 700 suitable for implementing embodiments of the present disclosure is shown. The terminal device in the embodiments of the present disclosure may include a mobile terminal such as a mobile phone, a notebook computer, a digital radio broadcasting receiver, a personal digital assistant (PDA), a portable android device (PAD), a portable multimedia player (PMP), a vehicle terminal (such as a vehicle navigation terminal), and a fixed terminal such as a digital television (TV) and a desktop computer. The electronic device shown in FIG. 7 is only an example.

As shown in FIG. 7, the electronic device 700 may include a processing apparatus (such as a central processing unit, and a graphics processor) 701, and the electronic device 700 may execute various appropriate actions and processes according to a program stored in a read-only memory (ROM) 702 or a program loaded from a storage apparatus 708 to a random access memory (RAM) 703. In RAM 703, various programs and data required for operations of the electronic device 700 are also stored. The processing apparatus 701, ROM 702, and RAM 703 are connected to each other by a bus 704. An input/output (I/O) interface 705 is also connected to the bus 704.

Typically, the following apparatuses may be connected to the I/O interface 705: an input apparatus 706 such as a touch screen, a touchpad, a keyboard, a mouse, a camera, a microphone, an accelerometer, and a gyroscope; an output apparatus 707 such as a liquid crystal display (LCD), a loudspeaker, and a vibrator; a storage apparatus 708 such as a magnetic tape, and a hard disk drive; and a communication apparatus 709. The communication apparatus 709 may allow the electronic device 700 to wireless-communicate or wire-communicate with other devices so as to exchange data. Although FIG. 7 shows the electronic device 700 with various apparatuses, it should be understood that it is not required to implement or include all the apparatuses shown. Alternatively, it may implement or include the more or less apparatuses.

Specifically, according to the embodiments of the present disclosure, the process described above with reference to the flow diagram may be achieved as a computer software program. For example, embodiments of the present disclosure include a computer program product, the computer program product includes a computer program loaded on a non-transient computer-readable medium, and the computer program contains a program code for executing the method shown in the flow diagram. In such embodiments, the computer program may be downloaded from the network by the communication apparatus 709 and installed, or installed from the storage apparatus 708, or installed from ROM 702. When the computer program is executed by the processing apparatus 701, the above functions in the method according to the embodiments of the present disclosure can be executed.

It should be noted that the above computer-readable medium in the present disclosure may be a computer-readable signal medium, a computer-readable storage medium, or any combinations of the two. The computer-readable storage medium may be, for example, a system, an apparatus or a device of electricity, magnetism, light, electromagnetism, infrared, or semiconductor, or any combinations of the above. The computer-readable storage medium may include: an electric connector with one or more wires, a portable computer magnetic disk, a hard disk drive, a random access memory (RAM), a read-only memory (ROM), an erasable programmable read-only memory (EPROM or flash memory), an optical fiber, a portable compact disk read-only memory (CD-ROM), an optical storage device, a magnetic storage device or any suitable combinations of the above. In the present disclosure, the computer-readable storage medium may be any visible medium that contains or stores a program, and the program may be used by an instruction executive system, apparatus or device or used in combination with it. In the present disclosure, the computer-readable signal medium may include a data signal propagated in a baseband or as a part of a carrier wave, it carries the computer-readable program code. The data signal propagated in this way may adopt various forms, including an electromagnetic signal, an optical signal, or any suitable combinations of the above. The computer-readable signal medium may also be any computer-readable medium other than the computer-readable storage medium, and the computer-readable signal medium may send, propagate, or transmit the program used by the instruction executive system, apparatus or device or in combination with it. The program code contained on the computer-readable medium may be transmitted by using any suitable medium, including: a wire, an optical cable, a radio frequency (RF) or the like, or any suitable combinations of the above.

In some implementation modes, a client and a server may be communicated by using any currently known or future-developed network protocols such as a HyperText Transfer Protocol (HTTP), and may interconnect with any form or medium of digital data communication (such as a communication network). Examples of the communication network include a local area network (LAN), a wide area network (WAN), an internet work (such as the Internet), and an end-to-end network (such as an ad hoc end-to-end network), as well as any currently known or future-developed networks.

The above computer-readable medium may be contained in the above electronic device; and it may also exist separately without being assembled into the electronic device.

The above computer-readable medium carries one or more programs, and the one or more programs, when executed by the electronic device, cause the electronic device to: display a multimedia content on a content display page; and display, in response to a determination that there is a popular comment on the multimedia content, comment prompt information on the content display page when a display duration of the multimedia content reaches a first preset duration threshold, wherein the comment prompt information is used to prompt an active user to view comments on the multimedia content by triggering a display position of a comment control.

The computer program code for executing the operation of the present disclosure may be written in one or more programming languages or combinations thereof, the above programming language includes object-oriented programming languages such as Java, Smalltalk, and C++, and also includes conventional procedural programming languages such as a "C" language or a similar programming language. The program code may be completely executed on the user's computer, partially executed on the user's computer, executed as a standalone software package, partially executed on the user's computer and partially executed on a remote computer, or completely executed on the remote computer or server. In the case involving the remote computer, the remote computer may be connected to the user's computer by any types of networks, including LAN or WAN, or may be connected to an external computer (such as connected by using an internet service provider through the Internet).

The flow diagrams and the block diagrams in the drawings show possibly achieved system architectures, functions, and operations of systems, methods, and computer program products according to various embodiments of the present disclosure. At this point, each box in the flow diagram or the block diagram may represent a module, a program segment, or a part of a code, the module, the program segment, or a part of the code contains one or more executable instructions for achieving the specified logical functions. It should also be noted that in some alternative implementations, the function indicated in the box may also occur in a different order from those indicated in the drawings. For example, two consecutively represented boxes may actually be executed basically in parallel, and sometimes it may also be executed in an opposite order, this depends on the function involved. It should also be noted that each box in the block diagram and/or the flow diagram, as well as combinations of the boxes in the block diagram and/or the flow diagram, may be achieved by using a dedicated hardware-based system that performs the specified function or operation, or may be achieved by using combinations of dedicated hardware and computer instructions.

The involved units described in the embodiments of the present disclosure can be achieved by a mode of software, or achieved by a mode of hardware.

The functions described above in this article may be at least partially executed by one or more hardware logic components. For example, exemplary types of the hardware logic component that may be used include: a field programmable gate array (FPGA), an application specific integrated circuit (ASIC), an application specific standard product (ASSP), a system on chip (SOC), a complex programmable logic device (CPLD) and the like.

In the context of the present disclosure, the machine-readable medium may be a visible medium, and it may contain or store a program for use by or in combination with an instruction executive system, apparatus, or device. The machine-readable medium may be a machine-readable signal medium or a machine-readable storage medium. The machine-readable medium may include an electronic, magnetic, optical, electromagnetic, infrared, or semiconductor system, apparatus, or device, or any suitable combinations of the above. The machine-readable storage medium may include an electric connector based on one or more wires, a portable computer disk, a hard disk drive, RAM, ROM, EPROM (or a flash memory), an optical fiber, CD-ROM, an optical storage device, a magnetic storage device, or any suitable combinations of the above.

According to one or more embodiments of the present disclosure, Example 1 provides a comment prompt method, including:
displaying a multimedia content on a content display page; and
displaying, in response to a determination that there is a popular comment on the multimedia content, comment prompt information on the content display page when a display duration of the multimedia content reaches a first preset duration threshold, wherein the comment prompt information is used to prompt an active user to view comments on the multimedia content by triggering a display position of a comment control.

According to one or more embodiments of the present disclosure, Example 2 on the basis of Example 1, the step of displaying the comment prompt information on the content display page includes:
displaying at least one of a comment prompt effect and a comment prompt text on the content display page.

According to one or more embodiments of the present disclosure, Example 3 on the basis of the method of Example 2, the step of displaying at least one of the comment prompt effect and the comment prompt text on the content display page, including at least one of the following:
switching the comment control displayed on the content display page to display the comment prompt effect; and
switching comment related information displayed on the content display page to display the comment prompt text.

According to one or more embodiments of the present disclosure, Example 4 on the basis of the method of Example 3, after displaying the comment prompt information on the content display page, the method further includes:
in response to a comment viewing operation, displaying a comment panel for the multimedia content, and cancelling the display of the comment prompt information, wherein the comment viewing operation includes a triggering operation for the comment prompt information, and the comment panel is used to display the comments on the multimedia content.

According to one or more embodiments of the present disclosure, Example 5 on the basis of the method of any one of Examples 1-4, the popular comment includes at least one of the following: a comment with a number of likes greater than a preset number threshold, and a comment with a like rate greater than a preset like rate threshold.

According to one or more embodiments of the present disclosure, Example 6 on the basis of the method of any one of Examples 1-4, the step of, displaying, in response to a determination that there is a popular comment on the multimedia content, comment prompt information on the content display page when a display duration of the multimedia content reaches a first preset duration threshold includes:
in response to the determination that there is a popular comment on the multimedia content, and a time interval between a time point at which the active user last views comments and a present time point reaches a second preset duration threshold, displaying the comment prompt information on the content display page when the display duration of the multimedia content reaches the first preset duration threshold.

According to one or more embodiments of the present disclosure, Example 7 provides a comment prompt apparatus, including:
  a content display module, configured to display a multimedia content on a content display page; and
  an information display module, configured to display, in response to a determination that there is a popular comment on the multimedia content, comment prompt information on the content display page when a display duration of the multimedia content reaches a first preset duration threshold, wherein the comment prompt information is used to prompt an active user to view comments on the multimedia content by triggering a display position of a comment control.

According to one or more embodiments of the present disclosure, Example 8 provides an electronic device, including:
  a processor; and
  a memory, configured to store a program,
  the program, when executed by the processor, causes the processor to implement the comment prompt method according to any one of Examples 1-6.

According to one or more embodiments of the present disclosure, Example 9 provides a computer-readable storage medium, in which, a computer program is stored in the storage medium, and when the computer program is executed by a processor, the comment prompt method according to any one of Examples 1-6 is implemented.

According to one or more embodiments of the present disclosure, Example 10 provides a computer program product, in which, the computer program product, when is executed by a computer, causes the computer to implement the comment prompt method according to any one of Examples 1-6.

The invention claimed is:

1. A comment prompt method, comprising:
  displaying a multimedia content on a content display page; and
  displaying, in response to a determination that there is a popular comment on the multimedia content, comment prompt information on the content display page when a display duration of the multimedia content reaches a first preset duration threshold, wherein the comment prompt information is used to prompt an active user to view comments on the multimedia content by triggering a display position of a comment control, wherein
  displaying the comment prompt information on the content display page comprises displaying at least one of a comment prompt effect and a comment prompt text on the content display page, and
  displaying at least one of the comment prompt effect and the comment prompt text on the content display page comprises at least one of the following:
    switching the comment control displayed on the content display page to display the comment prompt effect; and
    switching comment related information displayed on the content display page to display the comment prompt text.

2. The method according to claim 1, wherein after displaying the comment prompt information on the content display page, the method further comprises:
  in response to a comment viewing operation, displaying a comment panel for the multimedia content, and cancelling the display of the comment prompt information, wherein the comment viewing operation comprises a triggering operation for the comment prompt information, and the comment panel is used to display the comments on the multimedia content.

3. The method according to claim 1, wherein the popular comment comprises at least one of the following: a comment with a number of likes greater than a preset number threshold, and a comment with a like rate greater than a preset like rate threshold.

4. The method according to claim 1, wherein displaying, in response to a determination that there is a popular comment on the multimedia content, comment prompt information on the content display page when a display duration of the multimedia content reaches a first preset duration threshold, comprising:
  in response to the determination that there is a popular comment on the multimedia content, and a time interval between a time point at which the active user last views comments and a present time point reaches a second preset duration threshold, displaying the comment prompt information on the content display page when the display duration of the multimedia content reaches the first preset duration threshold.

5. An electronic device, comprising:
  a processor; and
  a non-transitory memory, configured to store a program,
  wherein the program, when executed by the processor, causes the processor to:
    display a multimedia content on a content display page; and
    display, in response to a determination that there is a popular comment on the multimedia content, comment prompt information on the content display page when a display duration of the multimedia content reaches a first preset duration threshold, wherein the comment prompt information is used to prompt an active user to view comments on the multimedia content by triggering a display position of a comment control,
  wherein displaying the comment prompt information on the content display page comprises displaying at least one of a comment prompt effect and a comment prompt text on the content display page, and
  wherein displaying at least one of the comment prompt effect and the comment prompt text on the content display page comprises at least one of the following:
    switching the comment control displayed on the content display page to display the comment prompt effect; and
    switching comment related information displayed on the content display page to display the comment prompt text.

6. The electronic device according to claim 5, wherein after displaying the comment prompt information on the content display page, the program further causes the processor to:
  in response to a comment viewing operation, display a comment panel for the multimedia content, and cancel the display of the comment prompt information, wherein the comment viewing operation comprises a triggering operation for the comment prompt information, and the comment panel is used to display the comments on the multimedia content.

7. The electronic device according to claim 5, wherein the popular comment comprises at least one of the following: a comment with a number of likes greater than a preset number threshold, and a comment with a like rate greater than a preset like rate threshold.

8. The electronic device according to claim 5, wherein displaying, in response to a determination that there is a popular comment on the multimedia content, comment prompt information on the content display page when a display duration of the multimedia content reaches a first preset duration threshold comprises:

in response to the determination that there is a popular comment on the multimedia content, and a time interval between a time point at which the active user last views comments and a present time point reaches a second preset duration threshold, displaying the comment prompt information on the content display page when the display duration of the multimedia content reaches the first preset duration threshold.

9. A non-transitory computer-readable storage medium, wherein instructions are stored in the storage medium, and the instructions, when executed by a processor, cause the processor to:

display a multimedia content on a content display page; and display, in response to a determination that there is a popular comment on the multimedia content, comment prompt information on the content display page when a display duration of the multimedia content reaches a first preset duration threshold, wherein the comment prompt information is used to prompt an active user to view comments on the multimedia content by triggering a display position of a comment control, wherein displaying the comment prompt information on the content display page comprises displaying at least one of a comment prompt effect and a comment prompt text on the content display page, and wherein displaying at least one of the comment prompt effect and the comment prompt text on the content display page comprises at least one of the following:

switching the comment control displayed on the content display page to display the comment prompt effect; and switching comment related information displayed on the content display page to display the comment prompt text.

10. The medium according to claim 9, wherein after displaying the comment prompt information on the content display page, the instructions further cause the processor to:

in response to a comment viewing operation, display a comment panel for the multimedia content, and cancel the display of the comment prompt information, wherein the comment viewing operation comprises a triggering operation for the comment prompt information, and the comment panel is used to display the comments on the multimedia content.

11. The medium according to claim 9, wherein the popular comment comprises at least one of the following: a comment with a number of likes greater than a preset number threshold, and a comment with a like rate greater than a preset like rate threshold.

12. The medium according to claim 9, wherein displaying, in response to a determination that there is a popular comment on the multimedia content, comment prompt information on the content display page when a display duration of the multimedia content reaches a first preset duration threshold comprises:

in response to the determination that there is a popular comment on the multimedia content, and a time interval between a time point at which the active user last views comments and a present time point reaches a second preset duration threshold, displaying the comment prompt information on the content display page when the display duration of the multimedia content reaches the first preset duration threshold.

\* \* \* \* \*